United States Patent [19]

Knepper

[11] 4,253,295
[45] Mar. 3, 1981

[54] LATERAL FLOAT MECHANISM FOR COMBINES

[75] Inventor: Larimer J. Knepper, New Holland, Pa.

[73] Assignee: Sperry Corporation, New Holland, Pa.

[21] Appl. No.: 91,445

[22] Filed: Nov. 5, 1979

[51] Int. Cl.³ .................... A01D 67/00; A01D 41/00
[52] U.S. Cl. ................................ 56/15.6; 56/16.2; 56/209; 56/DIG. 9
[58] Field of Search ............... 56/16.2, 208, DIG. 9, 56/15.6, 15.7, 15.8, 209

[56] References Cited

U.S. PATENT DOCUMENTS

| | | | |
|---|---|---|---|
| 2,947,134 | 8/1960 | Clifford et al. | 56/209 |
| 3,270,489 | 9/1966 | Rohweder | 56/DIG. 9 |
| 3,559,384 | 2/1971 | Bernhardt et al. | 56/14.6 |
| 3,638,407 | 2/1972 | Togami | 56/208 |
| 3,731,470 | 5/1973 | Cornish et al. | 56/208 |

FOREIGN PATENT DOCUMENTS 1206648  9/1970  United Kingdom ............ 56/DIG. 9

Primary Examiner—Paul J. Hirsch
Attorney, Agent, or Firm—Larry W. Miller; Frank A. Seemar; James R. Bell

[57] ABSTRACT

A lateral float mechanism for a combine header is disclosed wherein the header is detachably mounted to a separate cradle assembly which is centrally pivotably mounted on the feeder house. Structure is provided for locking the header to the cradle assembly for preventing fore-and-aft movement between the cradle assembly and the feeder house and for selectively controlling the extent of pivotal movement of the cradle assembly.

36 Claims, 6 Drawing Figures

LATERAL FLOAT MECHANISM FOR COMBINES

BACKGROUND OF THE INVENTION

The present invention relates generally to crop harvesting machines, commonly referred to as combines, and, more particularly to providing a mechanism for allowing the header to laterally float in response to the contour of the ground.

Combines, particularly the self-propelled type, are equipped to utilize a variety of crop gathering headers, including headers specifically designed for harvesting corn, cereal grains or soy beans. Normally, these headers are attached to the forward end of the feeder house, which is a structure used to convey crop material from the header to the combine base unit for further harvesting treatment. As is shown in U.S. Pat. No. Re. 26,512, the forward end of the feeder house can be constructed so that the header can be quickly and easily attached thereto. Usually, the feeder house structure is rectangular in shape and includes a rectangular crop inlet opening at the forward end.

Particularly with the modern trend of developing headers of increasingly larger sizes, providing the capability of a header to follow the contours of the ground is increasingly desirable. One type of prior art leveling mechanism, as can be seen in U.S. Pat. No. 3,981,125, involves the twisting of the feeder house structure about the centerline thereof (i.e. the line of travel of the combine) to effect an associated lateral floating movement of the header. Hillside combines have been developed to allow the header to follow slopes of up to 45 percent. Such hillside combines have been known to utilize a side pivot mechanism as seen in U.S. Pat. No. 3,731,470, and also a center mounted pivot connection directly between the header and the feeder house wherein the connection involves a specific semi-circular opening between the feeder house and the header.

Problems that have been encountered with these prior are lateral float mechanisms include a difficult sealing situation between the feeder house and the base unit as the feeder house is twisted relative to the base unit, and the twisting of the feeder house drive mechanism also increases wear which reduces life in the drive chains. Another problem found in the prior art leveling mechanisms is the matching of different types of headers to different feeder house structures. This problem is particularly relevant to feeder houses having specially shaped crop inlet openings.

SUMMARY OF THE INVENTION

It is an object of this invention to overcome the aforementioned disadvantages of prior art by providing a pivotal cradle assembly interconnecting the feeder house and the header.

It is a feature of this invention to provide a simple means for allowing the combine header to float laterally and follow the contours of the ground.

It is another object of this invention to provide a means to give greater flexibility in adapting different detachable headers to different feeder houses.

It is still another object of this invention to reduce sealing problems between the feeder house and the combine base unit.

It is an advantage of this invention to increase the life of a feeder house driven by reducing the amount of twisting necessary in the feeder house to provide a lateral float capability.

It is a further object of this invention to provide a combine header lateral float mechanism which is durable in construction, inexpensive in manufacture, facile in assemblage and simple and effective in use.

These and other objects, features and advantages are accomplished according to the instant invention by providing a lateral float mechanism for a combine header wherein the header is detachably mounted to a separate cradle assembly which is centrally pivotably mounted on the feeder house, structure being provided for locking the header to the cradle assembly for preventing fore-and-aft movement between the cradle assembly and the feeder house and for selectively controlling the extent of pivotal movement of the cradle assembly.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE INVENTION

Figure 1:
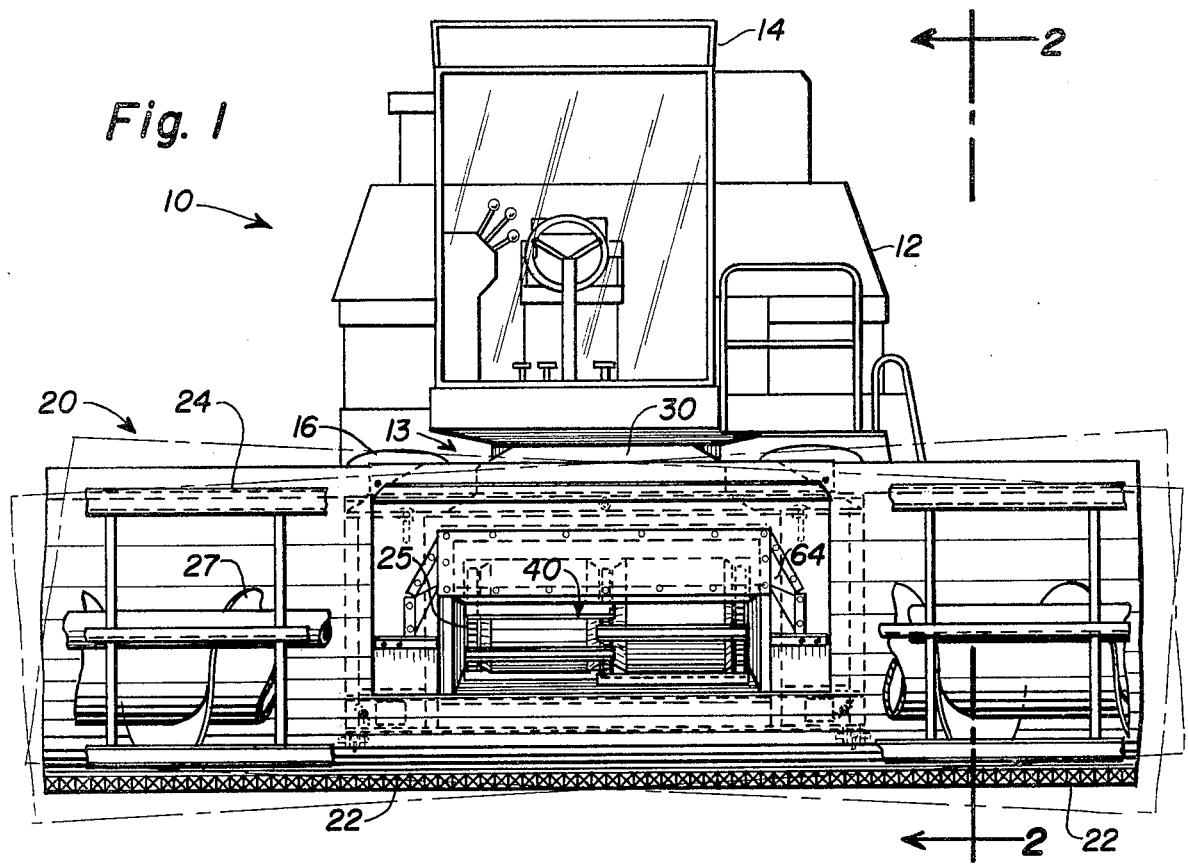
FIG. 1 is a front elevational view of a self-propelled combine, having a grain header attached thereto, incorporating the principles of the present invention.

Referring now to the drawings and particularly to FIG. 1, a front elevational view of the crop harvesting machine commonly referred to as a self-propelled combine can be seen. Left and right references are used as a matter of convenience and are determined by standing at the rear of the machine facing the forward end, the direction of travel. This combine 10 is generally comprised of a base unit 12, including a crop harvesting means 13 for separating the desired crop material from the waste crop material, a detachable crop gathering header 20 located forwardly of the base unit 12, a cab 14 elevated above the header 20 for full view of the crop harvesting process occurring therein, a wheeled frame 16 and a feeder house 30 for conveying crop material harvested by the header 20 rearwardly to the base unit 12 for treatment by the crop harvesting means 13, which, for example, can be a conventional threshing unit or the more recently developed rotary type axial flow harvesting unit, as is depicted in the drawings.

Figure 2:
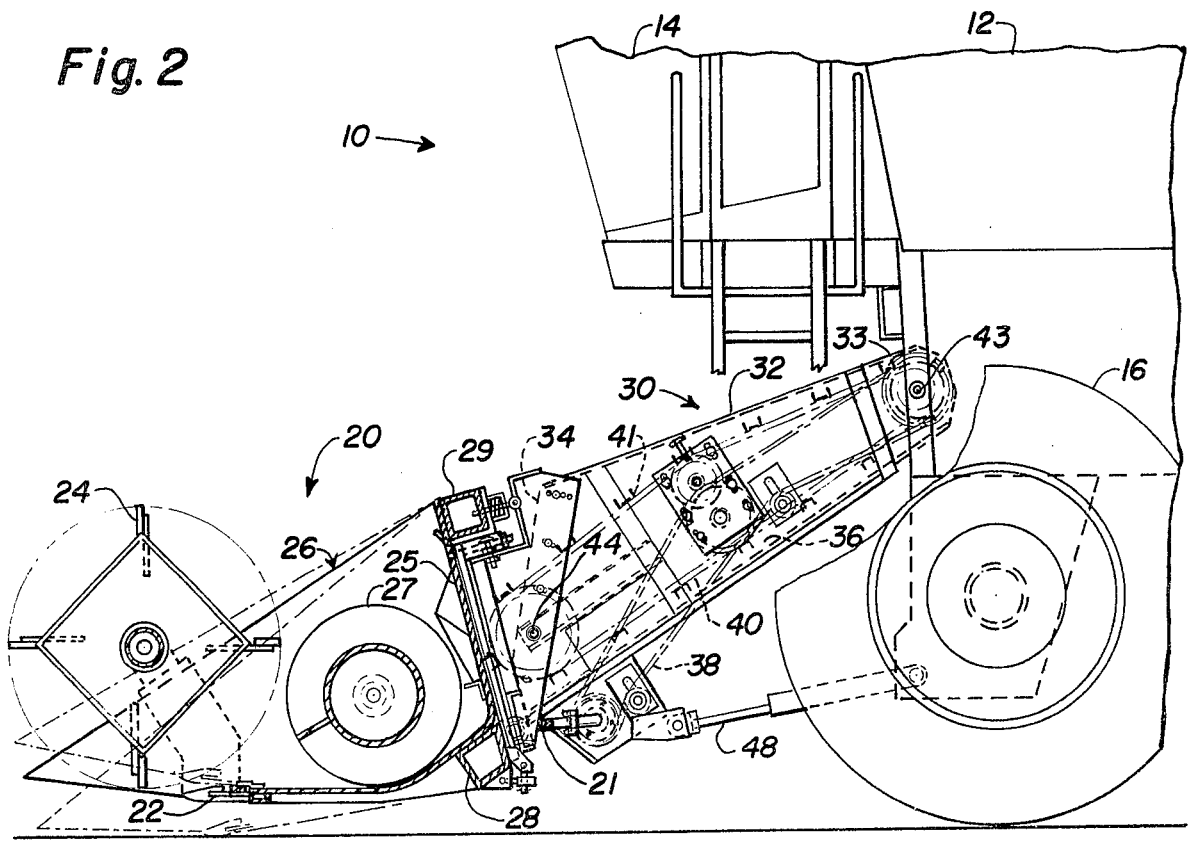
FIG. 2 is a cross sectional view of the forward portion of the combine, including the header and feader house areas; shown in FIG. 1 taken along line 2—2.

Referring now to the cross sectional view of FIG. 2, a more detailed view of the general inner workings between the header 20, feeder house 30 and base unit 12 can be seen. The header 20 includes a forwardly disposed crop cutting means 22, seen in FIG. 2 in the form of a reciprocating type mower, for severing crop material from the ground. A reel 24 is disposed above and forwardly of the cutter means 22 to sweep crop material over the cutting means 22 and transport it rearwardly to the consolidating means 26, seen in the form of a consolidating auger 27. The consolidating auger 27 converges crop material towards a centrally disposed crop discharge opening 25, better seen in FIG. 1, for discharge to the feeder house structure 30.

As will be discussed hereinafter, varying the angle of the cutting means 22 relative to the ground, as can be seen in phantom in FIG. 2, is important to the efficiency to the crop gathering header, relative to loss of crop material in different types of crops. The frame 28 of header 20 includes a transversely disposed main header beam 29, which is used to support the header 20 from the feeder house 30. One skilled in the art will readily realize that this invention is not limited to a cutting means 22 of the reciprocating type nor a consolidating means 26 in the form of a consolidating auger 27.

As can also be seen in FIG. 2, the feeder house 30 generally includes a forwardly disposed, elongated body portion 32 defined by a rearward end 33 pivotably attached to the base unit 12 and a forward end 34 adjacent the header 20 for connection thereto. The body portion 32 includes a passageway 36 therethrough, terminating in a crop inlet opening 39 at the forward end 34, for allowing crop material to be transported rearwardly from the forward end 34 to the rearward end 33. A crop conveying means 40, normally in the form of an endless chain and slat apron conveyor 41, is positioned within the passageway 36 for transporting the crop material rearwardly. Generally, the apron conveyor 41 is driven by a drive shaft 43 positioned at the rearward end 33. A driven shaft 44 adjacent the forward end 34 enables the endless apron conveyor 41 to rotate into an operative position for transporting crop material rearwardly.

A crop conveyor drive means 38, which receives rotational power from the header drive shaft 21, is also found mounted on the feeder house 30. The height of the header 20 relative to the ground is controlled by a header lift means 48 interconnecting the feeder house 30 and the base unit 12. By extending the header lift means 48 and pivoting the rearward end 33 of the feeder house 30 about the drive shaft 43, thereby rotating the feeder house 30 about the drive shaft 43, the header 20 can be lifted from the ground without significantly changing the discharge point of the apron conveyor 41 relative to the base unit 12.

Figure 4:
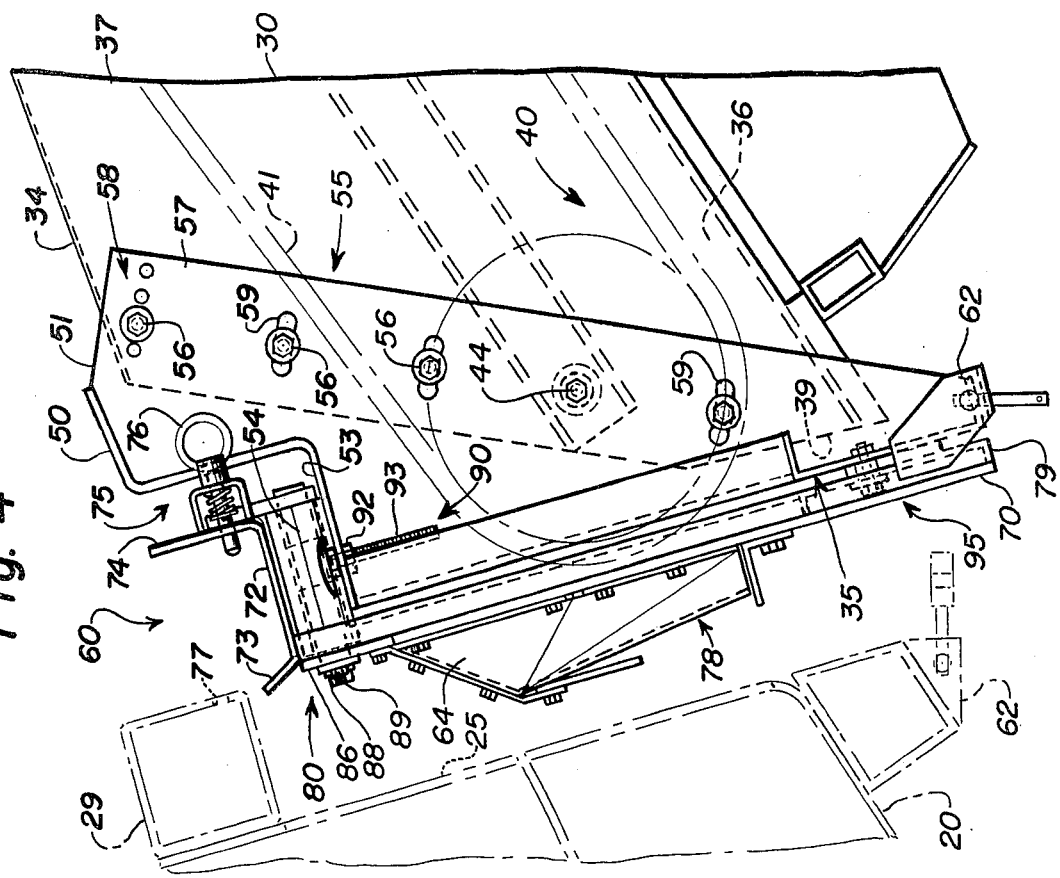
FIG. 4 is a side elevational view of the forward portion of the feeder house showing the front face member and the cradle assembly, the detachable header being shown in phantom proximate to the cradle assembly.

Referring now to FIG. 4, an enlarged view of the forward end 34, showing the front face member 50 and a detached header 20 in phantom proximate thereto, can be seen. The front face member 50 is a separate structure pivotably attached to the forward end 34 of the feeder house 30 for rotational movement such that the top 51 of the front face member 50 is movable in a fore-and-aft direction. The front face member 50 includes an offset section 53 substantially registerable with the main header beam 29 for supporting the header 20 in a detachable operable position.

Although it is possible to attach the front face member 50 to the feeder house 30 without having a fixed pivot point, it has been found to be preferable to use the axis defined by the driven shaft 44 of the conveying means 40 as a fixed pivot point. By such an arrangement, since the distance between the discharge opening 25 and the conveying means 40 is fixed, the efficiency of the crop conveying means 40 to engage the crop material discharged by the header and to convey it rearwardly is not impaired by rotation of the front face member 50.

The front face member 50 includes side sheets 57 which project rearwardly in close proximity to the sidewalls 37 of the feeder house 30. The side sheets 57 include a plurality of multi-positionable apertures 58, which can also be in the form of slot-shaped apertures 59. These apertures 58, 59 are registerable with holes (not shown) in the sidewalls 37. Bolts 56, interfitting corresponding apertures and holes serve to restrict and control the extent of movement of the front face member 50 and to act as a stabilizing means 55.

Figure 3:
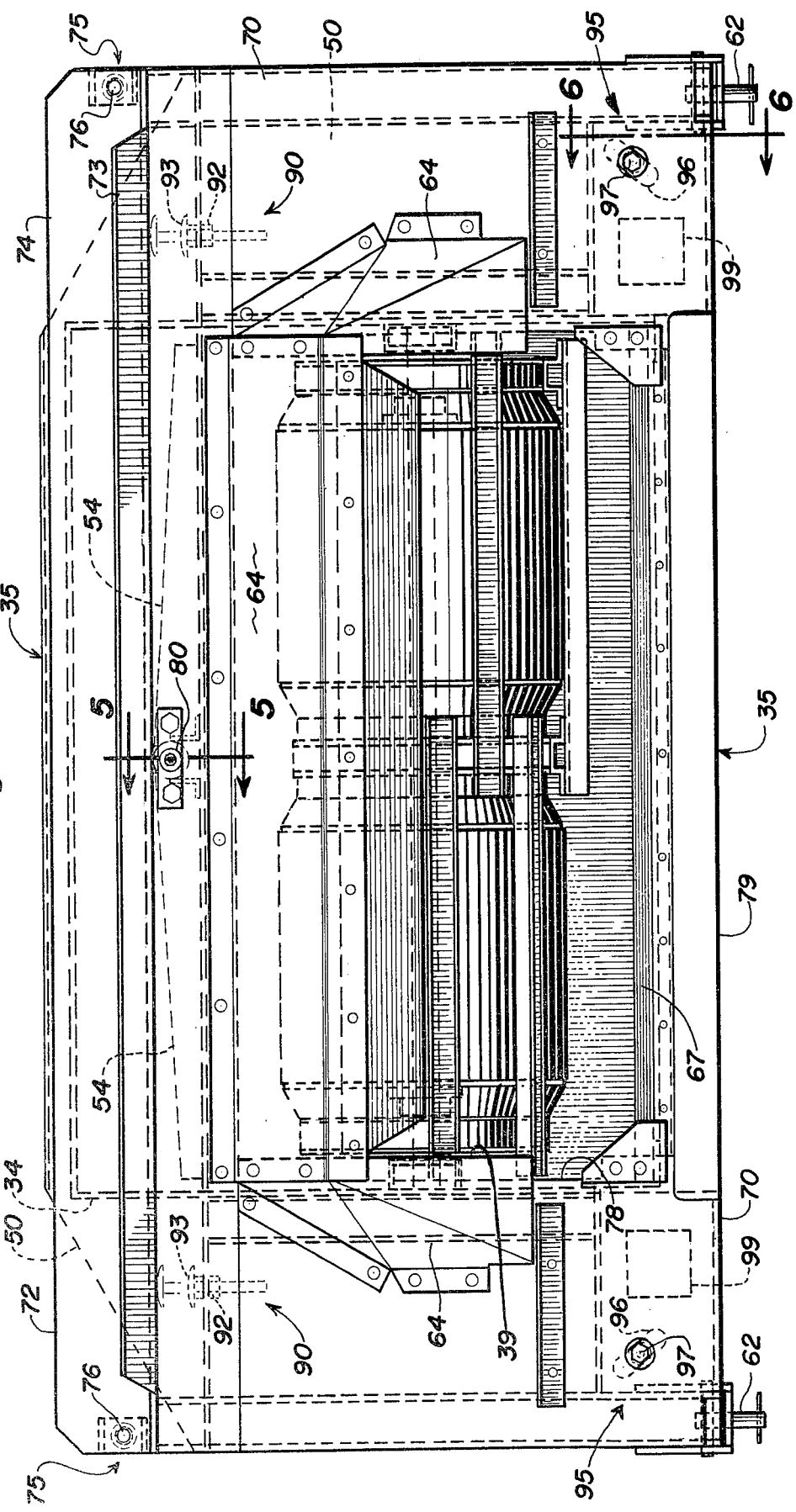
FIG. 3 is an enlarged front elevational view of the cradle assembly at the forward end of the feeder house, the header being removed for clarity.

The lateral float mechanism 60 can be best seen in FIGS. 3 and 4. A separate cradle assembly 70 is pivotably affixed to the forward end 34 of the feeder house 30 for rotation generally about the direction of travel. In the preferred embodiment seen in FIGS. 3 and 4, the cradle assembly 70 is pivotably affixed to the center of the offset section 53 in the front face member 50 by a pivot means 80; however, the cradle assembly 70 could instead be attached to the forward end 34 of the feeder house 30. For purposes of description, the cradle assembly 70 will hereinafter be referred to as being pivotably affixed to an attachment face 35, which is defined as being that part of the feeder house 30 to which the feeder 20 is attached.

The cradle assembly 70 includes a crop passage opening 78 which is registerable with both the header discharge opening 25 and the crop inlet opening 39. The cradle assembly 70 also includes a nesting portion 72 which overlaps the offset section 53 of the attachment face 35 for receiving and attaching the main header beam 29. The nesting portion 72 has a preferred substantially U-shaped configuration, as best seen in FIG. 4, with the forward leg 73 being shorter than the rear leg 74 and bent forwardly for facilitating the connection between the main header beam 29 and the nesting portion 72. To either side of the pivot 80, the nesting portion 72 includes a locking means 75 in the form of a spring loaded locking pin 76 which is positioned to interfit within corresponding holes 77 in the main header beam 29 to lock the beam 29 into an operative position, wherein the crop discharge opening 25, the crop passage opening 78 and the crop inlet opening 39 are substantially aligned.

To control the pivotal movement of the cradle assembly 70 about the pivot 80, a pivot control means 90, seen in the form of a screw device 92 to each side of the pivot 80, operates to limit the rotation of the nesting postion 72. The bolts 93, forming part of the screw device 92, are threaded into the offset section 53 of the attachment face 35 and can be adjusted upwardly to restrict the extent of possible rotation of the cradle assembly 70. Moreoever, by proper manipulation of the left and right bolts 93 in conjunction with each other, the cradle assembly 70 can be locked into an infinite number of rotated positions within the confines imposed by the physical constraints of the screw device 92 itself. If should be further realized by one skilled in the art that one or more hydraulic cylinders interconnecting either the base unit or the feeder house and the cradle assembly would be effective as a pivot control means. To further limit the pivotal movement of the cradle assembly 70 and to provide support for the nesting portion 72 upon full left or full right rotation, the offset section 53 of the attachment face 35 includes an inclined ramp 54 on each side of the pivot means 80.

A latch mechanism 62 locks the lower end 79 of the cradle assembly 70 to the corresponding portion of the header 20 to further aid in retaining the header 20 in an operative position relative to the cradle assembly 70 and the feeder house 30. Latch mechanism 62 is shown in the preferred embodiment as being of the overcenter variety. The cradle assembly 70 also includes a forwardly projecting crop retention hood 64, which extends into the discharge opening 25 of the header 20 to retain crop material within the feeder house passageway 36.

Figure 5:
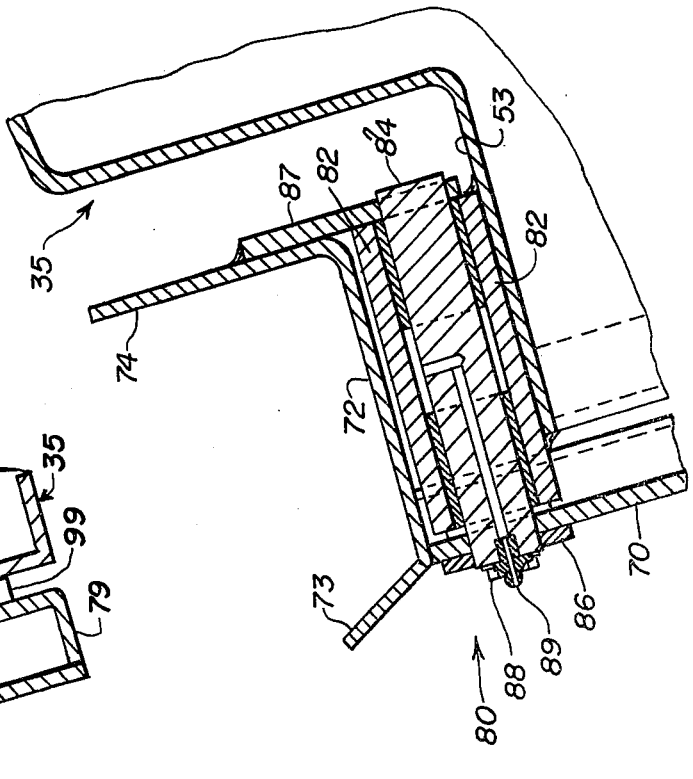
FIG. 5 is a cross sectional view of the cradle assembly pivot means taken along line 5—5 in FIG. 3.

The pivot 80 is best seen in the enlarged view of FIG. 5. A tubular housing 82 is rigidly affixed to the attachment face 35. A circular dowel 84 rotatably extends through the housing 82 and includes a front plate member 86. As is seen in FIG. 3 and FIG. 5, front plate 86 is detachably affixed to the cradle assembly by two screws 88 to facilitate the removal and/or repair of the pivot 80. A rear plate member 87 is rigidly affixed to the rear leg 74 of the nesting portion 72 and is supported by the dowel 84. FIG. 5 reveals the provision of a grease zerk 89 for renewing the supply of lubricant between the dowel 84 and the housing 82. It should be noted that the grease zerk 80 may not be essential; however, it is preferable.

Figure 6:
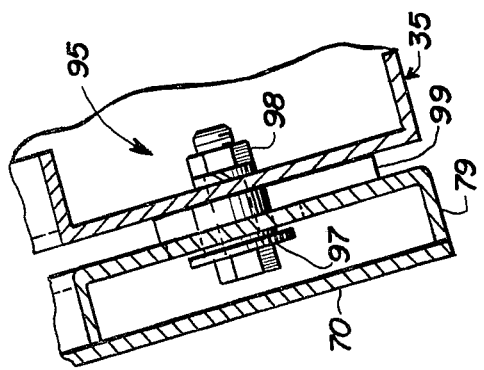
FIG. 6 is a cross sectional view showing the retaining means interconnecting the cradle assembly and a feeder house taken along line 6—6 in FIG. 3.

To keep the cradle assembly 70 from separating from the attachment face 35, particularly at the lower portion 79 thereof, the cradle assembly 70 includes a retaining means 95 interacting between the lower portion 79 of the cradle assembly 70 and the attachment face 35. As can be best seen in FIG. 3 and FIG. 6, the lower portion 79 includes left and right slot shaped holes 96 through which a bolt and washer assembly 97 extends to thread into the attachment face 35, or in the alternative, held in place on the attachment face 35 by a nut 98. The slot shaped holes 96 allow rotation of the cradle assembly 70 while the bolt and washer assembly 97 keeps the cradle assembly 70 in close proximity to the attachment face 35. A spacer 99, shown in the form of a plastic block, keeps the cradle assembly 70 and the attachment face 35 from coming into sliding contact with each other. It should be further realized by one skilled in the art that other forms of spacers, such as a roller, could be similarly used.

To operate the lateral float mechanism 60, the pivot control means 90 is manipulated to effect the desired rotation of the cradle assembly 70 about the pivot means 80. The header 20, being attached to the cradle assembly 70, is rotatable therewith and is positionable to correspond to the slope of the ground. Total rotation of the cradle assembly 70 and attached header 20, from a full left rotation to a full right rotation, is in the range of six to eight degrees, representing approximately 3½ degrees to each side of horizontal. As the cradle assembly 70 is rotated, the crop passage opening 78 therethrough becomes slightly askewed to the crop inlet opening 38 at the beginning of the feeder house passageway 36. To prevent a loss of crop material because of the askewed openings 36, 78 and because of the separation between the cradle assembly 70 and the attachment face 35 due to the presence of the spacer 99, a flexible seal 67, as can be best seen in FIG. 3, extends between the cradle assembly 70 and the front face member 50.

Since different crops require different angles for the cutting means 22 relative to the ground for best cutting efficiency and least crop loss, the cutting means/ground angular relationship can be selectively adjusted by manipulating the stabilizing means 55 such that the front face member 50 is rotated in a fore-and-aft direction, thereby affecting a corresponding angular change between the cutting means 22 and the ground. Providing a pivot point at the axis corresponding to the driven shaft 44 of the endless apron conveyor 41 keeps the header 20 at a constant distance from the endless apron conveyor 41 so that the efficiency of the crop conveying means 40 to engage the crop material and transport it rearwardly is not impaired.

By providing a combine with both a lateral float mechanism 60, in the form of a cradle assembly 70, and a front face member 50, one skilled in the art should readily realize that a very flexible header mounting combination is obtained. Furthermore, an adjustment of the distance between the cutting means 22 and the ground can be easily obtained by manipulation of the header lift means 48 (e.g. extension and retraction of the hydraulic cylinder), which extends between the feeder house 30 and the base unit 12.

It will be understood that various changes in the details, material, steps and arrangement of parts which have been described and illustrated in order to explain the nature of the invention, will occur to and may be made by those skilled in the art upon a reading of the disclosure within the principles and scope of the invention.

Having thus described the invention, what is claimed is:

1. A feeder house extending from combine base unit for transferring harvested crop material collected by a detachable header to said base unit for further harvesting treatment, said feeder house comprising:
   a frame;
   an elongated forwardly extending body portion supported by said frame, said body portion having a forward end, including a crop inlet opening, a rearward end, including a crop outlet opening, a passageway extending between said crop inlet and crop outlet openings for the passage of crop material to said base unit, and a centerline extending between said forward end and said rearward end, whereby said feeder house is substantially equally situated on either side of said centerline, said forward end including an attachment face for connection to the header;
   a crop conveying means operably housed within said body portion for transporting crop material rearwardly towards the base unit;
   a cradle assembly having a pivot means pivotally attaching said cradle assembly to said attachment face, said cradle assembly having a crop passage opening substantially registered with said crop inlet opening, said cradle assembly pivot means being proximate to said body portion centerline, said cradle assembly including a header connecting means for attaching the header to said cradle assembly to prevent relative movement therebetween, said cradle assembly further having retaining means cooperable with said attachment face to prevent relative fore-and-aft movement therebetween while allowing pivotal movement of said cradle assembly in a substantially vertical plane, and a pivot control means cooperatively associated with said cradle assembly and said attachment face for selectively controlling the extent of pivotal movement therebetween; and drive means for driving said crop conveying means.

2. The feeder house of claim 1 wherein said cradle assembly includes a flexible sealing means extending to said attachment face to reduce loss of crop material between said cradle assembly and said forward end when said crop passage opening becomes askewed to said crop inlet opening upon rotation of said cradle assembly relative to said feeder house.

3. The feeder house of claim 1 wherein the header includes a frame having a main beam portion running transverse to the centerline of said body portion, the header connecting means including a substantially U-shaped nesting portion registerable with the main header beam for receiving same therewithin.

4. The feeder house of claim 3 wherein the header connecting means includes locking means to lock the main header beam into a preselected position within said nesting portion.

5. The feeder house of claim 4 wherein the main header beam includes two laterally spaced holes, said locking means including two locking pins cooperable with the main header beam holes to lock the main header beam into said preselected position within said nesting portion.

6. The feeder house of claim 5 wherein said locking pins are spring loaded to keep them engaged into the main header beam holes, said locking pins being positioned on either side of said centerline.

7. The feeder house of claim 3 wherein said cradle assembly pivot means includes a housing affixed to said feeder house attachment face, said housing having an opening extending fore-and-aft therethrough and a dowel rotatably secured within said opening, said cradle assembly being affixed to said dowel and pivotably rotatable therewith.

8. The feeder house of claim 7 wherein said nesting portion is positioned above said housing, said cradle assembly being supported by said dowel both forward and rearward of said housing.

9. The feeder house of claim 7 wherein said attachment face includes an offset section, said nesting portion being registerable with said offset section, said pivot means being affixed to said offset section.

10. The feeder house of claim 9 wherein said offset section includes an inclined ramp on each side of said pivot means to support said nesting portion of said cradle assembly upon full rotation to either side of said pivot means.

11. The feeder house of claim 10 wherein said cradle assembly has a slot-shaped hole therein, said retaining means including a bolt and washer assembly cooperable between said forward end and said slot-shaped hole to limit the fore-and-aft movement of said cradle assembly, said slot-shaped hole having a size sufficient to permit rotation of said cradle assembly about said pivot means, said retaining means further including a spacer situated between said forward end and said cradle assembly to maintain a slight distance therebetween.

12. The feeder house of claim 9 wherein said pivot control means includes a screw device adjustably mounted in said offset area on each side of said centerline for selective substantially vertical movement, each said screw device being selectively positionable to engage the cradle assembly and limit pivotal movement thereof in each respective direction.

13. The feeder house of claim 9 wherein said pivot control means includes a hydraulic cylinder operably mounted between said cradle assembly and said frame of said feeder house to selectively rotate said cradle assembly.

14. The feeder house of claim 9 wherein said cradle assembly further includes a crop retention hood affixed thereto above and on either side of said crop passage opening and projecting forwardly thereof.

15. The feeder house of claim 9 wherein said cradle assembly is rotatable about said pivot means through a total angular rotation in the range of between about 6 degrees and about 8 degrees.

16. The feeder house of claim 15 wherein said cradle assembly is rotatable a maximum of about 3½ degrees to either direction.

17. The feeder house of claim 16 wherein said crop inlet opening is rectangular.

18. In a combine for harvesting crop material, said combine being attachable to a crop cutting and consolidating header for severing crop material from the ground and delivering it to said combine for further harvesting treatment, said combine having a mobile base unit; a crop treating means housed within said base unit for treatment of said crop material; and a feeder house projecting forwardly from said base unit to interconnect said header and said crop treating means, said feeder house including a crop conveying means located therewithin for transporting said crop material from said header to said crop treating means within said base unit, a forward end, a rearward end two laterally spaced sidewalls between said forward and rearward ends, and an attachment face adjacent said forward end for attaching said header to said feeder house, said forward end including a substantially rectangular crop inlet opening for receiving said crop material from said header, the improvement comprising:

a cradle assembly pivotably attached to said attachment face intermediate said sidewalls by a pivot means, said cradle assembly including a header connecting means for attaching the header to said cradle assembly such that the header cannot move relative to said cradle assembly, a substantially rectangular crop passage opening therethrough substantially registered with said crop inlet opening, in said feeder house, a retaining means cooperating with said feeder house to prevent relative fore-and-aft movement therebetween and a pivot control means cooperatively associated with said cradle assembly and said attachment face for selectively controlling the pivotal movement therebetween, whereby said cradle assembly rotates about said pivot means to allow said header to laterally float relative to said feeder house such that said header can follow the contour of the ground.

19. The combine of claim 18 wherein the header includes a frame having a main beam portion running transverse to the centerline of said body portion, said header connecting means including a nesting portion registerable with the main header beam for receiving said therewithin.

20. The combine of claim 19 wherein said header connecting means includes locking means to lock the main header beam into a preselected position within said nesting portion.

21. The combine of claim 20 wherein the main header beam includes two laterally spaced holes, said locking means including two spring loaded locking pins positioned on each side of said pivot means, said pins being cooperable with the main header beam holes to lock the main header beam into said preselected position within said nesting portion.

22. The combine of claim 20 wherein said attachment face includes an offset section, said nesting portion being registrable with said offset section, said pivot means being affixed to said offset section.

23. The combine of claim 22 wherein said offset section includes an inclined ramp on each side of said pivot means to support said nesting portion of said cradle assembly upon full rotation to either side of said pivot means.

24. The combine of claim 23 wherein said cradle assembly pivot means includes a housing affixed to said attachment face, said housing having an opening extending fore-and-aft therethrough and a dowel rotatably secured within said opening, said cradle assembly being affixed to said dowel and pivotably rotatable therewith.

25. The combine of claim 24 wherein said nesting portion is positioned above said housing, said cradle assembly being supported by said dowel both forward and rearward of said housing, said pivot means being affixed to the center of said offset section.

26. The combine of claim 25 wherein said cradle assembly has a slot-shaped hole therein, said retaining means including a bolt and washer assembly cooperable between said forward end and said slot-shaped hole to limit the fore-and-aft movement of said cradle assembly, said slot-shaped hole having a size sufficient to permit rotation of said cradle assembly about said pivot means, said retaining means further including a spacer situated between said forward end and said cradle assembly to maintain a slight distance therebetween.

27. The combine of claim 26 wherein said pivot control means includes a screw device adjustably mounted in said offset area on each side of said pivot means for selective substantially vertical movement, each said screw device being selectively positionable to engage the cradle assembly and limit pivotal movement thereof in each respective direction.

28. The combine of claim 26 wherein said pivot control means includes a hydraulic cylinder operably mounted between said cradle assembly and said feeder house to selectively rotate said cradle assembly.

29. A combine for harvesting crop material comprising:
- a mobile base unit including a crop treating means for harvesting said crop material;
- a detachable header forward of said base unit for severing said crop material from the ground and consolidating said crop material for delivery to said base unit, said header including a rear end wall having a crop discharge opening therein;
- a feeder house projecting forwardly from said base unit for transferring crop material from said header to said crop treating means in said base unit, said feeder house having a forward end adjacent said header, a rearward end pivotally affixed to said base unit adjacent said crop harvesting means to allow a vertical swinging movement of said forward end relative to said rearward end, an attachment face adjacent said forward end for attaching said header to said feeder house and two laterally spaced sidewalls extending between said forward end and said rearward end, said feeder house including a passageway therethrough between said sidewalls, said passageway terminating in a crop inlet opening at said forward end;
- a crop conveying means housed within said feeder house passageway for transporting crop material from said header to said crop treating means in said base unit;
- a cradle assembly pivotally attached to said attachment face by a pivot means intermediate said sidewalls, said cradle assembly including a header connecting means for receiving said header and detachably connecting same to said cradle assembly such that said header is movable integrally with said cradle assembly, a crop passage opening therethrough substantially registered with both said crop discharge opening and said crop inlet opening, retaining means cooperating with said feeder house to prevent relative fore-and-aft movement between said feeder house and said cradle assembly, and a pivot control means cooperatively associated with said cradle assembly and said attachment face for selectively controlling the pivotal movement between said cradle assembly and said feeder house, whereby said cradle assembly is rotatable about an axis corresponding to the line of travel of said base unit to allow said header to laterally float relative to said feeder house so that said header can follow the contour of the ground;
- a header lift means interconnecting said feeder house and said base unit for vertically rotating said forward end about said rearward end such that said attached header is moved vertically relative to the ground; and
- drive means for driving said crop treating means, said crop conveying means, said header and said header lift means.

30. The combine of claim 29 wherein said header includes a frame having a main beam portion running transverse to the centerline of said body portion, said header connecting means including a nesting portion registerable with said main header beam for receiving said therewithin.

31. The combine of claim 30 wherein said header connecting means includes locking means to lock said main header beam into position within said nesting portion such that said crop discharge opening is substantially aligned with said crop passage opening.

32. The combine of claim 31 wherein said cradle assembly pivot means includes a housing affixed to said attachment face beneath said nesting portion, said housing having an opening extending fore-and-aft therethrough and a dowel rotatably secured within said opening, said cradle assembly being supported by said dowel both forward and rearward of said housing and pivotably rotatable therewith.

33. The combine of claim 32 wherein said attachment face includes an offset section, said nesting portion being registerable with said offset section, said pivot means being affixed to the center of said offset section, said offset section including an inclined ramp on each side of said pivot means to support said nesting portion upon full rotation to either side of said pivot means.

34. The combine of claim 33 wherein said pivot control means includes a screw device adjustably mounted in said offset area on each side of said pivot means for selective substantially vertical movement, each said screw device being selectively positionable to engage the cradle assembly and limit pivotal movement thereof in each respective direction.

35. The combine of claim 33 wherein said pivot control means includes a hydraulic cylinder operably mounted between said cradle assembly and said feeder house to selectively rotate said cradle assembly.

36. The combine of claim 34 or 35 wherein said cradle assembly further includes a crop retention hood affixed thereto above and on either side of said crop passage opening and projecting forwardly thereof, said crop retention hood being projectable through crop discharge opening of said header.

* * * * *